L. PARADIS AND H. B. McCOUBREY.
VEHICLE BODY.
APPLICATION FILED FEB. 14, 1918.
1,321,389.
Patented Nov. 11, 1919.
2 SHEETS—SHEET 1.
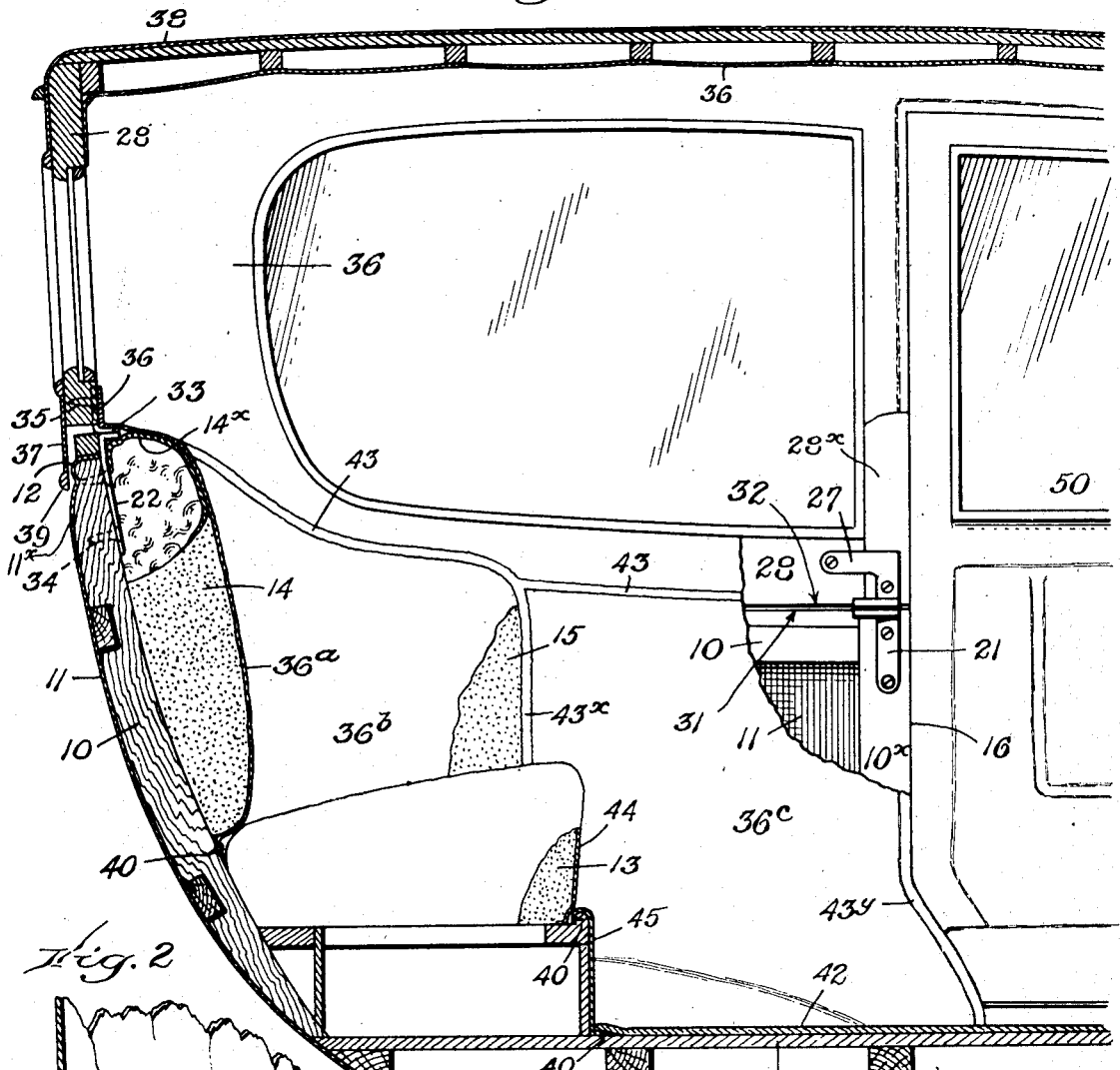
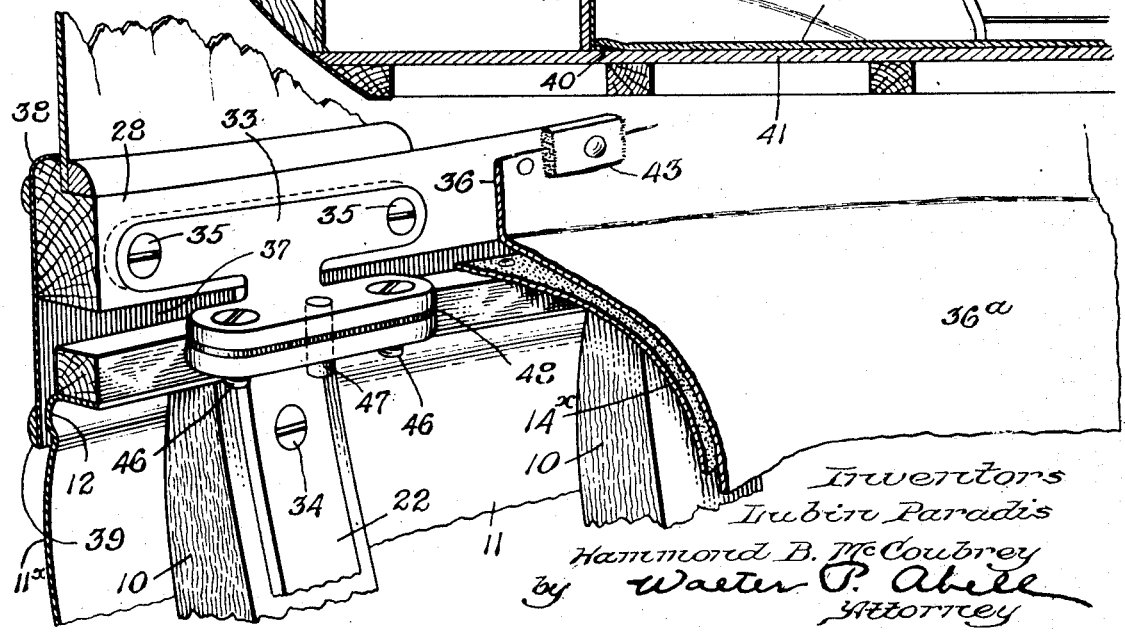

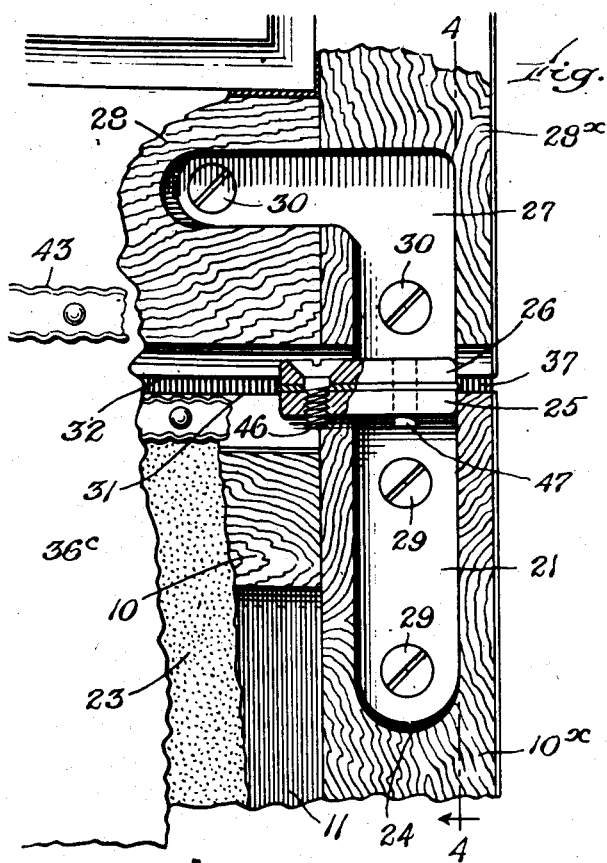
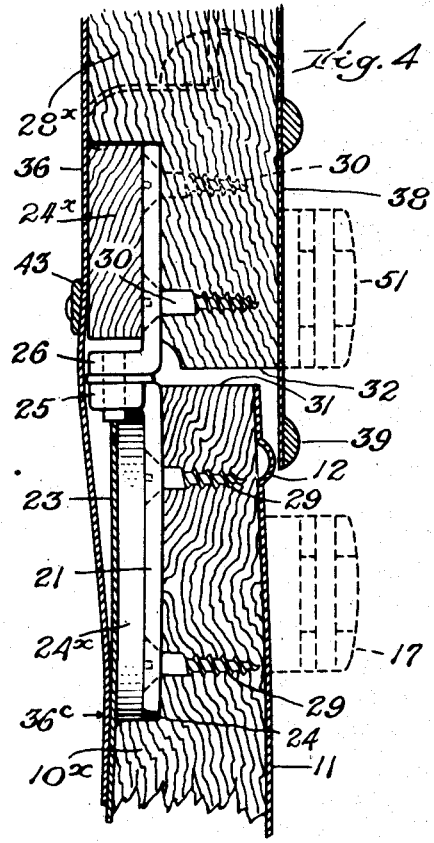
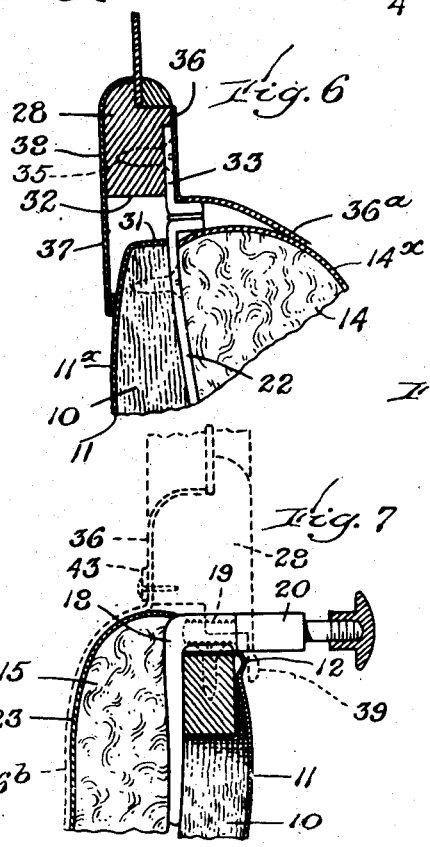
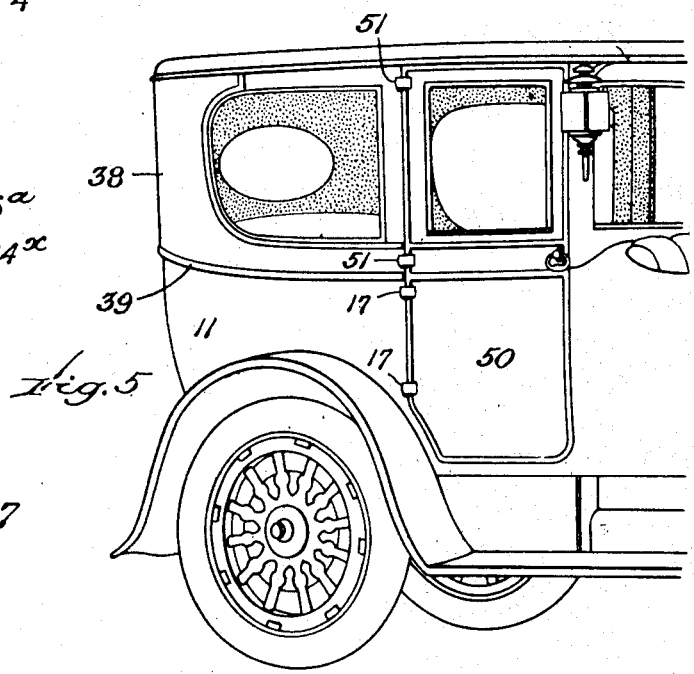

UNITED STATES PATENT OFFICE.

LUBIN PARADIS, OF SOMERVILLE, AND HAMMOND B. McCOUBREY, OF BOSTON, MASSACHUSETTS, ASSIGNORS TO SARGENT AND HAM COMPANY, OF BOSTON, MASSACHUSETTS, A CORPORATION OF MAINE.

VEHICLE-BODY.

1,321,389.

Specification of Letters Patent.

Patented Nov. 11, 1919.

Application filed February 14, 1918. Serial No. 217,454.

*To all whom it may concern:*

Be it known that we, LUBIN PARADIS and HAMMOND B. MCCOUBREY, citizens of the United States, residing, respectively, at 25 Campbell Park, Somerville, in the county of Middlesex and State of Massachusetts, and at 205 Faneuil street, Boston, in the county of Suffolk and State of Massachusetts, have invented new and useful Improvements in Vehicle-Bodies, of which the following is a specification.

This invention relates to vehicle bodies and more especially to passenger automobiles of the better quality. The object of the invention is to provide a detachable top section adapted to coöperate with the lower open section of a vehicle body, such as that of a touring car, runabout, or roadster, to provide an inclosed body such as that of a limousine, town car, sedan, cabriolet, or coupélet.

Detachable tops for the purpose above stated have been in use heretofore, but they have been so readily recognizable as such that users who desire closed bodies of fine appearance, and are able to afford the latter, have not found such detachable tops satisfactory, for the reason that they show plainly the dual construction of the combination and could not pass as unitary closed bodies. Such car users have therefore found it necessary to purchase either complete cars having closed bodies or to purchase complete closed bodies for substitution in place of some other body upon a running frame or chassis.

Our invention solves the problem of combining an open body section and a closed top section without disclosing the dual aspect of the combination, the upper and lower sections being so joined and trimmed that they are to all intents and appearances, inside and out, a unitary closed body. The top section may, nevertheless, be readily detached to restore the lower section to its original condition with some slight alterations involving the metal fittings commonly provided for mounting a collapsible canopy top, and some minor alterations in the trimmings upon the interior of the lower section. The fixtures just referred to can be removed for the mounting of the top section and can be replaced when the top section is removed or they may be made in two parts so that one part may remain permanently attached to the lower section and the other part detached when the top section is mounted.

For the purpose of illustrating our invention we have selected a touring car body and a top section, which, when assembled, provide a closed body of the town car type. The fundamental parts exemplified in this specific case are applicable in the case of any of the other types hereinbefore mentioned, depending upon the style of the lower section and the style of the upper section desired.

Of the accompanying drawings Figure 1 represents a vertical section in a plane from front to rear showing the rear part or tonneau of a touring car body with a detachable top mounted thereon to convert the body into a town car. Fig. 2 represents a perspective view of the joint at the rear, or at the extreme left of Fig. 1, portions of the inside lining or trimming being broken away to show the fittings by which the two sections are secured one to another. Fig. 3 represents an elevation, partly in section, of the joint adjacent the door of the closed compartment. Fig. 4 represents a vertical section through the structure intersected by line 4—4 of Fig. 3. Fig. 5 represents a perspective view of the rear portion of a car comprising the touring body and the detachable closed top shown in the other figures. Fig. 6 is a section showing a modification. Fig. 7 is a section showing a take-apart fixture for mounting a collapsible canopy top.

The same reference characters indicate the same parts wherever they occur.

The lower section of the body is a standard touring body of well known design, and comprises the usual wooden frame 10 and sheet metal sheathing 11. Some bodies are ornamented by external beads and some do not have such beads. When beads are provided they are usually pressed in the sheathing 11 as indicated at 12, and in the case of touring cars they extend along the upper rim and sometimes elsewhere. The usual seat cushion of the tonneau is indicated at 13, and the usual back cushion and the side cushions are indicated at 14 and 15 respectively. The usual doorway of the tonneau body is indicated at 16, and the usual hinges for mounting one of the doors of the tonneau are indicated at 17, 17.

In preparing the original body for the reception of the detachable top section we cut off the projecting stud portions of the usual fixtures 18 that are commonly secured permanently to the frame 10 for mounting the collapsible canopy top. We then bore and tap the remaining portions of said fixtures 18 to provide an internal screw thread 19 for the reception of detachable stud portions such as that indicated at 20. These stud portions are screwed into the fixtures 18 only when it is desired to substitute a collapsible canopy top for the detachable closed top hereinafter described, the stud portions 20 being detached and put away when the top is mounted. We further prepare the lower section of the body by adding metal fixtures 21 and 22 to sustain the weight of the detachable top section, and to fasten the latter to the lower section. As shown by Figs. 3 and 4 the fixtures 21 are embedded in the wooden members $10^x$ that form the doorway of the tonneau. For this purpose the original lining or trimming 23 of cloth or leather, with which the interior of the lower section is originally covered, is temporarily unfastened and turned back sufficiently to afford access to the frame members $10^x$ so that a suitable depression 24 may be formed in the latter for the reception of the fixture 21. This depression is formed upon the inner side of the frame so that the fixture may be afterward covered and concealed by the lining 23 when the latter is replaced and fastened. We cover the embedded portions of fixtures 21 with wooden filling pieces $24^x$, the latter being shaped to fill the depressions 24 so as to be flush with the surface of the frame and to take tacks for fastening the lining and other trimmings.

The upper portion of fixture 21 extends inwardly to form an ear 25, and this ear may, in most cases, protrude through the lining and remain exposed, without detracting to any considerable degree from the appearance of the lower section when the latter is used without the closed top. The projecting ear 25 serves as a seat for a companion ear 26 formed upon a fixture 27 that is permanently secured to and embedded in the wooden frame member $28^x$ of the detachable upper section. Fixture 21 is secured to the frame member $10^x$ by screws 29, and fixture 27 is secured to the top section by screws 30. The two fixtures are arranged so that they will insure a slight space between the confronting rims 31 and 32 of the two body sections.

Referring to Figs. 1 and 2 the rear portions of the two sections are joined by companion fixtures 22 and 33, the former of which has already been mentioned. Fixture 22 is affixed to the frame 10 by screws 34, and is arranged between the frame and the back cushion 14. Because of such arrangement there is no necessity for embedding the fixture 22 in the frame 10, the cushion 14 serving to conceal the fixture without being displaced thereby on account of the thickness of the fixture. In order, however, to attach the fixture 22, the original covering $14^x$ of the cushion 14 is temporarily detached from the frame 10 and is again replaced and secured after the fixture has been secured to the frame. Fixture 33 is secured to the wooden frame 28 of the upper section by screws 35 and is preferably embedded in the latter frame so that its surface will be flush with that of the frame to enable the lining 36 of cloth, leather, or other suitable sheet material to lie smoothly against the frame 28 instead of forming a hump where it covers fixture 33. Fixtures 22 and 33 are likewise arranged to support the upper section so that there will be a slight space between the rims of the two sections, as hereinbefore explained in reference to fixtures 21 and 27. This is because it is desirable to avoid rubbing of one rim upon another, in view of the probability that the upper section will, from time to time, be, removed to permit the original body to be used as originally intended.

The rim 32 is shaped to conform to the contour of the rim 31, and the crack between them is concealed by an external depending flange 37 secured to the upper section. In order to carry out the important consideration of making the upper section appear to be a permanent and integral part of the body we cover the upper section with a sheathing of thin sheet metal 38, and extend the lower marginal portion of the latter a distance of two or three inches, more or less, below the rim 32. This depending marginal portion of the sheathing provides the flange 37. The lower body section has an external bulging portion $11^x$ that projects outwardly beyond the perimeter of the upper rim thereof, such bulging formation being usual in bodies of present day design. This bulging formation is usually more pronounced at the rear of the body than at the sides, but is nevertheless present at the sides as shown by Figs. 4 and 7. When a bead 12 is provided it constitutes a bulging portion with which the flange 37 is adapted to coöperate to conceal the joint between the two sections. Having trimmed the lower edge of said flange according to the desired contour we turn up t¹ edge, in some cases, as shown by Fig. 6, and in other cases we attach an external bead 39 as shown by the other figures. In either case the lower edge is arranged so close to the aforesaid bulging portion of the lower section that it appears to be a part of the latter. The slight ridge thus formed enhances the artistic effect of the combination, although the flange has the practical function of excluding wind, rain, snow, and dust. If the lower section of the body has a bead 12 the bead 39 may be arranged to be substantially coextensive therewith, in which event bead 39 appears to be fastened to the sheathing below it as much as to that above it.

In order to carry out the fundamental idea of having the two sections appear as one we provide suitable interior trimmings that conceal the joint between the two sections and provide a smooth interior finish. This effect is brought about by covering the interior of the upper section with the lining 36 as hereinbefore mentioned, and by extending the lower marginal portion of said lining downwardly far enough to cover the back cushion 14, the side cushion 15, and the upstanding walls of the lower section between the side cushion 15 and the doorway 16. That portion of the lining 36 that covers the back cushions 14 is shown in section in Fig. 1 and is indicated at 36ª. The lower edge of the portion 36ª is fastened temporarily to the frame 10, under back cushion 14, by any suitable means such as tacks 40. These tacks may be easily removed preparatory to removing the upper section of the body, so that the depending portion of the upper lining may remain permanently attached to the upper section of the body to be stored away with the latter. That portion of the upper lining that covers the side cushions 15 is indicated at 36ᵇ, and its lower edge may be fastened in substantially the same manner as the portion 36ª, by tacks, or otherwise. The portion of the upper lining that covers the upstanding walls of the lower section between the side cushions 15 and the doorway 16 is indicated at 36ᶜ and it extends to the floor 41 and is preferably fastened to the latter by any suitable means such as tacks 40. When a floor mat 42 is used it will cover the edges of the upper lining that are fastened to the floor. Thus the original covering or lining 23 of the lower section is covered by depending portions of the upper lining, and a smooth internal finish is provided. Strips 43 of gimp, braid, or other upholstering material may be applied to the upper section to fasten the upper lining to the latter adjacent the rim 32, and at any other points where it is desired to trim the upper section. These strips of trimming need not be detached or loosened after having once been applied excepting such portions as may extend below the rim 32 to be fastened to the frame of the lower section. For example Fig. 1 includes a strip 43ˣ of upholstering material that extends downwardly in front of the side cushions 15, and a strip 43ʸ that extends along the edge of doorway 16. These strips may be fastened temporarily by tacks so that they may be readily unfastened when it is desired to remove the upper section of the body. The original trimmings of the lower section may remain permanently attached, in which case the trimmings that belong permanently to the upper section may be laid over them.

If it is desired to cover the seat cushion 13 with the same kind of material as that used for lining of the walls and other cushions, a suitable slip cover 44 may be used to cover the seat while the upper section is in use. Such slip cover may be detached from the seat when the upper section of the body is removed. The idea of having all the internal surfaces covered to harmonize with each other may be still further satisfied by attaching a section 45 of the same kind of lining material to the front surface of the foundation upon which the seat cushion rests. As shown by Fig. 1 the lower edge of section 45 rests upon the floor and is overlapped by the floor mat 42.

The external depending flange 37, and the internal depending portions of the upper lining form a channel for the reception of the upper rim of the lower section of the body, external flange 37 creating the appearance of a unitary closed body so far as external appearances are concerned and serving to exclude, to a considerable extent wind, rain, snow, and dust from entering the compartment between the rims of the two sections. The depending portions of the lining, however, coöperate with the external flange to exclude the undesirable elements above mentioned.

In order to hold the upper section in place upon the lower section the fixtures 21, 27, 22 and 33 are fastened one to another by suitable fasteners such as screws 46. In the present instance the screws are passed freely through the ears of the upper fixtures, and have screw-threaded engagement with the ears of the lower fixtures, the latter being bored and tapped for that purpose. In order to insure the desired registration of the screw holes, and in order to assist in preventing the rim of one section from springing laterally in relation to that of the other section, we insert dowels 47 tightly in the fixtures of the upper section, and provide the fixtures of the lower section with suitable holes to receive said dowels. It is desirable to interpose pads 48 of relatively soft sheet material between the contiguous portions of the upper and lower fixtures, to prevent rattling and to prevent the screws 46 from working loose.

The best results, for mechanical and artistic reasons, require unitary doors such as that indicated at 50 in Fig. 5, instead of doors made in two sections and joined in the same general plane as the rims of the upper and lower sections of the body. For this reason we detach the original doors of the lower section 10, but use the hinges 17 thereof, with one or more other hinges to mount unitary doors such as 50. In some cases the undercut or curve of the doorway 16 would make it more convenient to mount the door 50 by means of one hinge on the lower section of the body, and two hinges 51 on the upper section, while in other cases it might be more convenient to retain the two lower hinges 17 and provide only one hinge for the upper half of the door. In many cases, however, it is possible to utilize both the lower hinges 17 and to provide two upper hinges, and whenever the latter is possible it is desirable to do so because the door serves to reinforce the connection between the two sections of the body. Such reinforcement not only helps to sustain the upper section of the body from rising relatively to the lower section but it helps to sustain lateral stresses that would have a tendency to spring the rim of one section laterally in relation to the rim of the other section. The reinforcing function of the door is greatest when four hinges are used, but it exists to a considerable degree when only three hinges are used, and in the latter case it would not make any material difference whether two hinges were fastened to the lower section and one hinge to the upper section, or whether two hinges were fastened to the upper section and one hinge to the lower section.

Although, for the sake of illustration, the upper section does not extend forward of the back of the front seat of the car, in many cases it would be desirable to extend it to the cowl in front of the forward seat to provide a sedan body or a berline limousine body as the case may be, in which event the usual wind shield in front of the forward seat would be detached to permit the detachable upper section of the body to be fitted to the cowl. It will be readily understood from what has been illustrated and described, that additional fixtures substantially like those indicated at 21, 27, 22 and 33 may be provided to fasten the forward portions of a sedan or berline top section to the forward portion of the lower body section.

We claim—

1. The combination with the lower open section of an automobile body having an exterior bulging portion below and projecting outwardly beyond the perimeter of its upper rim, of a detachable upper section having a frame formed to occupy edge-to-edge relation with the rim of said lower section, said upper section having an external sheet-metal sheathing the lower marginal portion of which depends below the bottom of said frame and lies in contiguous and lapped relation to said bulging portion, said lower marginal portion being flush with the sheathing above said rims.

2. The combination with the lower open section of an automobile body, of a detachable top section having a frame as thick as and conforming to the rim of the lower section, the top section having a lining and an external sheet-metal sheathing both of which extend below the frame to form a channel for the rim of the lower section, and means arranged in said channel to hold said sections connected.

3. The combination with the lower open section of an automobile body, of a detachable top section having a bottom rim conforming to the top rim of said lower section, said top section having a lining extending from the ceiling to the bottom of the lower section so as to conceal the sectional character of the combination.

4. The combination with the lower open section of an automobile body, of a detachable top section having a bottom rim conforming to the top rim of said lower section, said lower section having cushions secured to its walls, and said top section having a lining the lower marginal portion of which depends below said rims to cover said cushions and upstanding walls.

5. The combination with the lower open section of an automobile body, of a detachable top section having a bottom rim conforming to the top rim of said lower section, said lower section including a frame and a lining, fixtures embedded in and secured to said frame between the latter and said lining, relatively small portions of said fixtures protruding through said lining, and fixtures secured to the interior of said top section and arranged to rest upon said protruding portions of said embedded fixtures within the perimeter of said rims to sustain said top section otherwise than by contact of said rims one upon another, said fixtures of both said sections having coöperative portions fitting one within another to maintain lateral registration of said sections.

6. The combination with the lower open section of an automobile body, of a detachable top section having a bottom rim conforming to the top rim of said lower section, said top section having an external sheathing of sheet metal and a lining of flexible sheet material both depending below said bottom rim to form a channel for inclosing said top rim of the lower section, the depending marginal portion of said lining being arranged to cover the internal surface of the upstanding walls of said lower section.

7. The combination with the lower open section of an automobile body, of a detachable top section having a frame as thick as and conforming to the rim of the lower section, said sections being arranged in edge-to-edge relation, and external means and internal means constructed and arranged to conceal the sectional character of the combination and to present the visual effect of a unitary closed body.

In testimony whereof we have affixed our signatures.

LUBIN PARADIS.
HAMMOND B. McCOUBREY.